(No Model.)
W. H. KNIGHT.
DISTRIBUTION SYSTEM FOR ELECTRIC RAILWAYS.
No. 533,905. Patented Feb. 12, 1895.
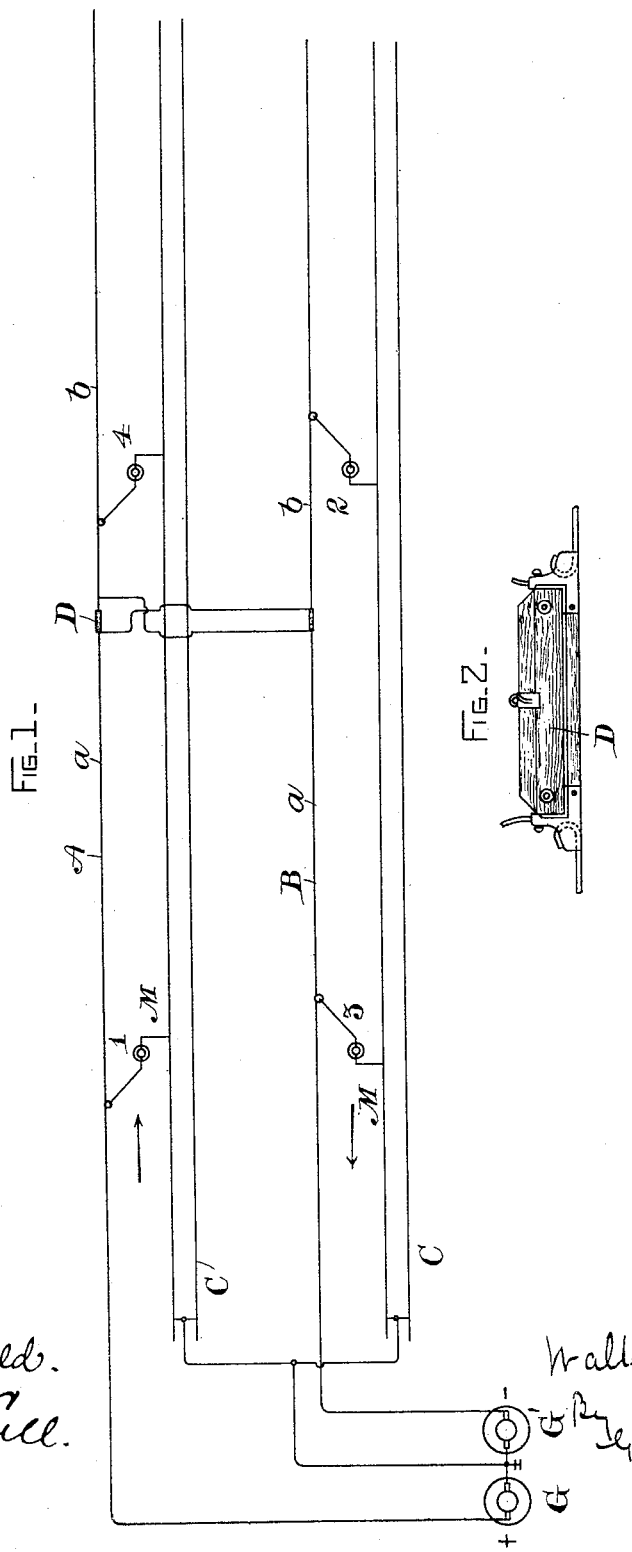

UNITED STATES PATENT OFFICE.

WALTER H. KNIGHT, OF SCHENECTADY, NEW YORK, ASSIGNOR TO THE THOMSON-HOUSTON ELECTRIC COMPANY, OF BOSTON, MASSACHUSETTS.

DISTRIBUTION SYSTEM FOR ELECTRIC RAILWAYS.

SPECIFICATION forming part of Letters Patent No. 533,905, dated February 12, 1895.

Application filed November 30, 1894. Serial No. 530,403. (No model.)

*To all whom it may concern:*

Be it known that I, WALTER H. KNIGHT, a citizen of the United States, residing at Schenectady, county of Schenectady, State of New York, have invented certain new and useful Improvements in Distribution Systems for Electric Railways, of which the following is a specification.

My present invention relates to a system of distribution for electric railways. It has been heretofore proposed to connect up the trolley wires of a double track road, so that they form the outer mains of a three-wire system, the track rails and ground forming the neutral, but in practical installations of this character it has been found difficult to preserve the system fairly well balanced, since the load on the different branches of necessity becomes at times very unequal. For example, on a grade, the motors traveling in one direction must take the necessary current to enable them to climb the grade, while the motors traveling in the opposite direction are running light. A similar difficulty also is found in elevated railroads when the loads on the up and down tracks are very unequal at different times of day.

The principal object of the present invention is to overcome the difficulties heretofore growing out of the failure to maintain the two branches of the system fairly well balanced, and this object is accomplished by crossing over the trolley wires of the different tracks at desired or necessary points, so that some of the motors on one track will be coupled between the positive main and the neutral, while others will be coupled between the neutral and the negative main. In this way it will be apparent that the load on any one track may be balanced up as circumstances require between the different branches of the system, instead of balancing the load of one track against the other, as has heretofore been customary.

In the drawings illustrating the invention, Figure 1 represents in diagram a double track electric railway comprising two sections cross-connected in accordance with the invention, and Fig. 2 is a detail view of a section insulator.

A B represent the trolley wires for the different tracks, which are connected respectively to the positive and negative terminals of a pair of generators G G' coupled in series in the manner customary with three-wire systems. The tracks C form the neutral and are connected to the generators, as shown. Motors are represented on the two tracks at M, some of which are supposed to be traveling in one direction and some in the other, as is indicated by the arrows. It will be observed that the trolley wires for the respective tracks are divided into insulated sections by section-insulators D of any desired character. Section *a* of trolley wire A is connected across to section *b* of trolley wire B, and in a similar manner section *a* of trolley wire B is connected to section *b* of trolley wire A. Hence it will be seen that motors 1 and 2, although traveling on different tracks, are connected between the positive main of the system and the neutral, while motors 3 and 4 are similarly connected between the neutral and the negative main. When any of the motors pass from one section to another of the trolley wire, it at the same time passes from one branch to the other of the system.

While the drawings illustrate a road divided only into two sections, it is of course understood, that as many cross connections will be made as are found desirable to maintain the balance in any given installation, and that the cross-connections described will be found desirable under a wide variety of conditions. In general, they will be useful wherever the grade of the road bed or the service conditions would naturally give rise to a lack of balance were the cross-connections omitted.

What I claim as new, and desire to secure by Letters Patent of the United States, is—

1. In a two-track electric railway, the combination of a three-wire system of supply conductors, and means for cross-connecting sections or portions of the conductors for the respective tracks, as described, so that the motors while traveling on one of the tracks are at times connected between the neutral and the positive main, and at other times between the neutral and negative main, as described.

2. In a double-track electric railway, the combination of trolley wires for the respective tracks forming the positive and negative mains of a three-wire distribution system, and the track forming the neutral, with cross-connections, as described, whereby different sections of the trolley wires of the respective tracks are connected, some to one branch and some to the other branch of the system.

3. In an electric railway, the combination of a trolley wire and section insulators dividing successive portions of the trolley wire into insulated sections, with circuit connections coupling such successive sections of the trolley wire respectively to the positive and negative branches of a three-wire distribution system, as set forth.

In witness whereof I have hereunto set my hand this 28th day of November, 1894.

WALTER H. KNIGHT.

Witnesses:
B. B. HULL,
A. F. MACDONALD.